(12) United States Patent
Hixson et al.

(10) Patent No.: US 9,751,446 B2
(45) Date of Patent: *Sep. 5, 2017

(54) MOBILE VENDING TRAILER

(71) Applicants: Mark M. Hixson, Hixson, TN (US); Robert P. Creswell, Chattanooga, TN (US)

(72) Inventors: Mark M. Hixson, Hixson, TN (US); Robert P. Creswell, Chattanooga, TN (US)

(*) Notice: Subject to any disclaimer, the term of this patent is extended or adjusted under 35 U.S.C. 154(b) by 2 days.

This patent is subject to a terminal disclaimer.

(21) Appl. No.: 14/519,085

(22) Filed: Oct. 20, 2014

(65) Prior Publication Data

US 2015/0035307 A1 Feb. 5, 2015

Related U.S. Application Data

(63) Continuation of application No. 12/939,133, filed on Nov. 3, 2010, now Pat. No. 8,864,207.

(51) Int. Cl.
*B60P 3/00* (2006.01)
*B60P 3/025* (2006.01)

(52) U.S. Cl.
CPC .................... *B60P 3/0257* (2013.01)

(58) Field of Classification Search
CPC .................................................... B60P 3/0257
USPC .............. 296/22, 24.36, 181.1; 414/498, 458
See application file for complete search history.

(56) References Cited

U.S. PATENT DOCUMENTS

| | | |
|---|---|---|
| D261,431 S | 10/1981 | Barton |
| D320,233 S | 9/1991 | Golley et al. |
| D340,681 S | 10/1993 | Alpiser et al. |
| 5,542,203 A | 8/1996 | Luoma et al. |
| 5,969,501 A | 10/1999 | Glidden et al. |
| 6,263,674 B1 | 7/2001 | Fileman et al. |
| 6,345,852 B1 | 2/2002 | McCarthy |
| 6,423,894 B1 | 7/2002 | Patz et al. |
| 6,604,087 B1 | 8/2003 | Kolls |
| D556,091 S | 11/2007 | Racich |
| D558,825 S | 1/2008 | Masters |
| 7,364,050 B2 | 4/2008 | Guard |
| D580,071 S | 11/2008 | Evans et al. |
| 7,448,516 B2 | 11/2008 | Davis et al. |
| D584,223 S | 1/2009 | Cooper |
| 7,795,837 B1 | 9/2010 | Haun et al. |

(Continued)

*Primary Examiner* — Joseph D Pape
(74) *Attorney, Agent, or Firm* — Crose Law LLC; Bradley D. Crose

(57) ABSTRACT

A mobile vending trailer is provided. In at least one embodiment, a solar-powered mobile vending apparatus includes: a portable chassis; a housing; at least one vending machine configured to be stored and transported in the housing; a solar panel array configured to capture sunlight and convert the captured sunlight into electricity, thereby to provide solar power to the vending machine; a plurality of batteries configured for charge from the electricity generated from the solar panel array in order to provide power to the at least one vending machine; a controller configured to control the solar panel array and the plurality of batteries; and at least one lift configured to lower and raise the vending machine. The solar-powered mobile vending apparatus is adapted for use both off-grid and on-grid. In various embodiments, the apparatus also includes one or more of a wind turbine, generator, inverter, and combiner.

17 Claims, 15 Drawing Sheets

(56) References Cited

U.S. PATENT DOCUMENTS

| | | | |
|---|---|---|---|
| 2010/0175736 A1 | 7/2010 | Reichart et al. | |
| 2010/0178143 A1* | 7/2010 | Smith | B60P 1/027 414/498 |
| 2010/0207452 A1* | 8/2010 | Saab | F03D 1/005 307/65 |

* cited by examiner

MOBILE VENDING TRAILER

CROSS-REFERENCE TO RELATED APPLICATION(S)

This present non-provisional patent application is a continuation of copending U.S. patent application Ser. No. 12/939,133, filed on Nov. 3, 2010, and entitled, "MOBILE VENDING TRAILER" and of which the application cited above is incorporated in-full by reference herein.

FIELD OF THE INVENTION

The technology described herein relates generally to the fields of vending systems, trailers, and alternative and traditional power sources. More specifically, this technology relates to a self-contained mobile vending trailer configured to hold and transport vending equipment, to provide vending services to patrons, and to provide power to the vending equipment with one or more interchangeable power sources including traditional and alternative power sources.

BACKGROUND OF THE INVENTION

Vending machines are known in the background art, and in many areas may appear ubiquitous. However, since many vending machines require a reliable power source, such as that provided by traditional AC power on the power grid, to provide refrigeration, light, control of electronics, or the like, use of vending machines in all places is limited.

Related utility patents known in the art include the following: U.S. Pat. No. 7,364,050, issued to Guard on Apr. 29, 2008, discloses mobile vending. U.S. Pat. No. 6,263,674, issued to Fileman et al. on Jul. 24, 2001, discloses a solar-powered mobile vending apparatus. U.S. Pat. No. 6,345,852, issued to McCarthy on Feb. 12, 2002, discloses a mobile vending assembly. U.S. Pat. No. 6,423,894, issued to Patz et al. on Jul. 23, 2002, discloses a motor vehicle roof with an outside solar generator. U.S. Pat. No. 5,969,501, issued to Glidden et al. on Oct. 19, 1999, discloses a portable solar power system. U.S. Pat. No. 5,542,203, issued to Luoma on Aug. 6, 1996, discloses a mobile sign with a solar panel. U.S. Pat. No. 7,448,516, issued to Davis et al. on Nov. 11, 2008, discloses an ice cream vending machine. U.S. Pat. No. 6,604,087, issued to Kolls on Aug. 5, 2003, discloses vending access to the internet, business application software, e-commerce, and e-business in a hotel room. U.S. Pat. No. 7,795,837, issued to Haun et al. on Sep. 14, 2010, discloses a portable solar power supply trailer with security containment area and multiple power interfaces.

Related design patents known in the art include the following: U.S. Pat. No. 584,223, issued to Cooper on Jan. 6, 2009, discloses the ornamental design for a mobile solar array. U.S. Pat. No. 340,681, issued to Alpiser et al. on Oct. 26, 1993, discloses the ornamental design for a solar powered broadcast trailer. U.S. Pat. No. 261,431, issued to Barton on Oct. 20, 1981, discloses the ornamental design for a vending trailer. U.S. Pat. No. 580,071, issued to Evans et al. on Nov. 4, 2008, discloses the ornamental design for an ice cream kiosk trailer. U.S. Pat. No. 556,091, issued to Racich on Nov. 27, 2007, discloses the ornamental design for an ice-cream cone trailer. U.S. Pat. No. 320,233, issued to Golley et al. on Sep. 24, 1991, discloses a front panel for a vending machine. U.S. Pat. No. 558,825, issued to Masters on Jan. 1, 2008, discloses an envelope shaped as a soda can.

Related published patent applications known in the art include the following: U.S. Published Patent Application 2010/0175736, filed by Reichart et al. and published on Jul. 15, 2010, discloses a method for generating electricity from solar panels for emergency trailer use.

The foregoing patent information reflects the state of the art of which the inventors are aware and is tendered with a view toward discharging the inventors' acknowledged duty of candor in disclosing information that may be pertinent to the patentability of the technology described herein. It is respectfully stipulated, however, that the foregoing patent and other information do not teach or render obvious, singly or when considered in combination, the inventors' claimed invention.

BRIEF SUMMARY OF THE INVENTION

In various exemplary embodiments, the technology described herein provides a self-contained mobile vending trailer configured to hold and transport vending equipment, to provide vending services to patrons, and to provide power to the vending equipment with one or more interchangeable power sources including traditional and alternative power sources.

In one exemplary embodiment, the technology described herein provides a solar-powered mobile vending apparatus. The solar-powered mobile vending apparatus includes: a portable chassis; a housing disposed upon the portable chassis; at least one vending machine configured to be stored and transported in the housing upon the portable chassis; a solar panel array, having a plurality of solar panels disposed upon the housing, configured to capture sunlight and convert the captured sunlight into electricity, thereby to provide solar power to the at least one vending machine; a solar array combiner to combine a plurality of inputs from the plurality of solar panels; a plurality of batteries disposed within the housing and configured for charge from the electricity generated from the solar panel array in order to provide power to the at least one vending machine; an inverter to convert between direct current (DC) and alternating current (AC); a grid-tie inverter configured to feed a net outflow of power into the utility grid when the mobile vending apparatus is on-grid; and a controller disposed within the housing and configured to control the solar panel array and the plurality of batteries. The solar-powered mobile vending apparatus is adapted for use both off-grid and on-grid.

The solar-powered mobile vending apparatus also can include at least one lift assembly disposed within the portable chassis and configured to lower the housing, in entirety, from a first level to a second level and to raise the housing from the second level to the first level.

The solar-powered mobile vending apparatus also can include at least one lift configured to lower the at least one vending machine from a first level in the housing to a second level and to raise the at least one vending machine from the second level to the first level.

The solar-powered mobile vending apparatus also can include an electrical generator to provide an additional power source to the plurality of vending machines when solar power is unavailable or the plurality of batteries is consumed.

The solar-powered mobile vending apparatus further can include a wind turbine, having a plurality of blades pushed by wind, and configured to extract energy from the wind to create wind power, thereby to provide wind power to the at least one vending machine when solar power is unavailable.

The portable chassis of the solar-powered mobile vending apparatus also can include a straight axle assembly disposed upon the portable chassis and at least one lift assembly disposed within the portable chassis and configured to lower the housing, in entirety, from a first level to a second level and to raise the housing from the second level to the first level.

The portable chassis of the solar-powered mobile vending apparatus also can include at least two wheels disposed upon opposing ends of a common axle; an axle support frame; and at least one lift assembly disposed within the portable chassis and configured to lower the housing, in entirety, from a first level to a second level and to raise the housing from the second level to the first level. The at least two wheels and the axle support frame are retractable to allow for operation of at least one lift configured to lower the at least one vending machine from a first level in the housing to a second level and to raise the at least one vending machine from the second level to the first level.

In another exemplary embodiment, the technology described herein provides a wind-powered mobile vending apparatus. The wind-powered mobile vending apparatus includes: a portable chassis; a housing disposed upon the portable chassis; at least one vending machine configured to be stored and transported in the housing upon the portable chassis; a wind turbine, having a plurality of blades pushed by wind, and configured to extract energy from the wind to create wind power, thereby to provide wind power to the at least one vending machine; a plurality of batteries disposed within the housing and configured for charge from the electricity generated from the wind turbine in order to provide power to the at least one vending machine; an inverter to convert between direct current (DC) and alternating current (AC); a grid-tie inverter configured to feed a net outflow of power into the utility grid when the mobile vending apparatus is on-grid; and a controller disposed within the housing and configured to control the wind turbine and the plurality of batteries. The wind-powered mobile vending apparatus is adapted for use both off-grid and on-grid.

The wind-powered mobile vending apparatus also can includes at least one lift assembly disposed within the portable chassis and configured to lower the housing, in entirety, from a first level to a second level and to raise the housing from the second level to the first level.

The wind-powered mobile vending apparatus also can includes at least one lift configured to lower the at least one vending machine from a first level in the housing to a second level and to raise the at least one vending machine from the second level to the first level.

The wind-powered mobile vending apparatus further can include an electrical generator to provide an additional power source to the plurality of vending machines when wind power is unavailable or the plurality of batteries is consumed.

The wind-powered mobile vending apparatus also can include a solar panel array, having a plurality of solar panels disposed upon the housing, configured to capture sunlight and convert the captured sunlight into electricity, thereby to provide solar power to the at least one vending machine when wind power is unavailable.

The portable chassis of the wind-powered mobile vending apparatus also can include a straight axle assembly disposed upon the portable chassis and at least one lift assembly disposed within the portable chassis and configured to lower the housing, in entirety, from a first level to a second level and to raise the housing from the second level to the first level.

The portable chassis of the wind-powered mobile vending apparatus also can include: at least two wheels disposed upon opposing ends of a common axle; an axle support frame; and at least one lift assembly disposed within the portable chassis and configured to lower the housing, in entirety, from a first level to a second level and to raise the housing from the second level to the first level. The at least two wheels and the axle support frame are retractable to allow for operation of at least one lift configured to lower the at least one vending machine from a first level in the housing to a second level and to raise the at least one vending machine from the second level to the first level.

In another exemplary embodiment, the technology described herein provides a combined solar-powered and wind-powered mobile vending apparatus. The combined solar-powered and wind-powered mobile vending apparatus includes: a portable chassis; a housing disposed upon the portable chassis; at least one vending machine configured to be stored and transported in the housing upon the portable chassis; a solar panel array, having a plurality of solar panels disposed upon the housing, configured to capture sunlight and convert the captured sunlight into electricity, thereby to provide solar power to the at least one vending machine; a solar array combiner to combine a plurality of inputs from the plurality of solar panels; a wind turbine, having a plurality of blades pushed by wind, and configured to extract energy from the wind to create wind power, thereby to provide wind power to the at least one vending machine; a plurality of batteries disposed within the housing and configured for charge from the electricity generated from the solar panel array and the wind turbine, in order to provide power to the at least one vending machine; an inverter to convert between direct current (DC) and alternating current (AC); a grid-tie inverter configured to feed a net outflow of power into the utility grid when the mobile vending apparatus is on-grid; and a controller disposed within the housing and configured to control the solar panel array, the wind turbine, and the plurality of batteries. The combined solar-powered and wind-powered mobile vending apparatus is adapted for use both off-grid and on-grid.

The combined solar-powered and wind-powered mobile vending apparatus also can include at least one lift assembly disposed within the portable chassis and configured to lower the housing, in entirety, from a first level to a second level and to raise the housing from the second level to the first level.

The combined solar-powered and wind-powered mobile vending apparatus also can include at least one lift configured to lower the at least one vending machine from a first level in the housing to a second level and to raise the at least one vending machine from the second level to the first level.

The combined solar-powered and wind-powered mobile vending apparatus also can include an electrical generator to provide an additional power source to the plurality of vending machines when solar power and wind power are unavailable or the plurality of batteries is consumed.

The combined solar-powered and wind-powered mobile vending apparatus further can include a portable chassis having a straight axle assembly disposed upon the portable chassis and at least one lift assembly disposed within the portable chassis and configured to lower the housing, in entirety, from a first level to a second level and to raise the housing from the second level to the first level.

The combined solar-powered and wind-powered mobile vending apparatus further can include at least two wheels disposed upon opposing ends of a common axle; an axle support frame; and at least one lift assembly disposed within the portable chassis and configured to lower the housing, in entirety, from a first level to a second level and to raise the housing from the second level to the first level. The at least two wheels and the axle support frame are retractable to allow for operation of at least one lift configured to lower the at least one vending machine from a first level in the housing to a second level and to raise the at least one vending machine from the second level to the first level.

In each of these described embodiments, multiple vending machines can be used. In these embodiments, the mobile vending apparatus can include a shared user interface and a shared dispenser disposed upon the housing of the mobile vending apparatus and coupled internally within the housing to each of the plurality of vending machines, wherein a user has access to an inventory of each of the plurality of vending machines through the shared user interface and receives an order through the shared dispenser.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Figure 1:
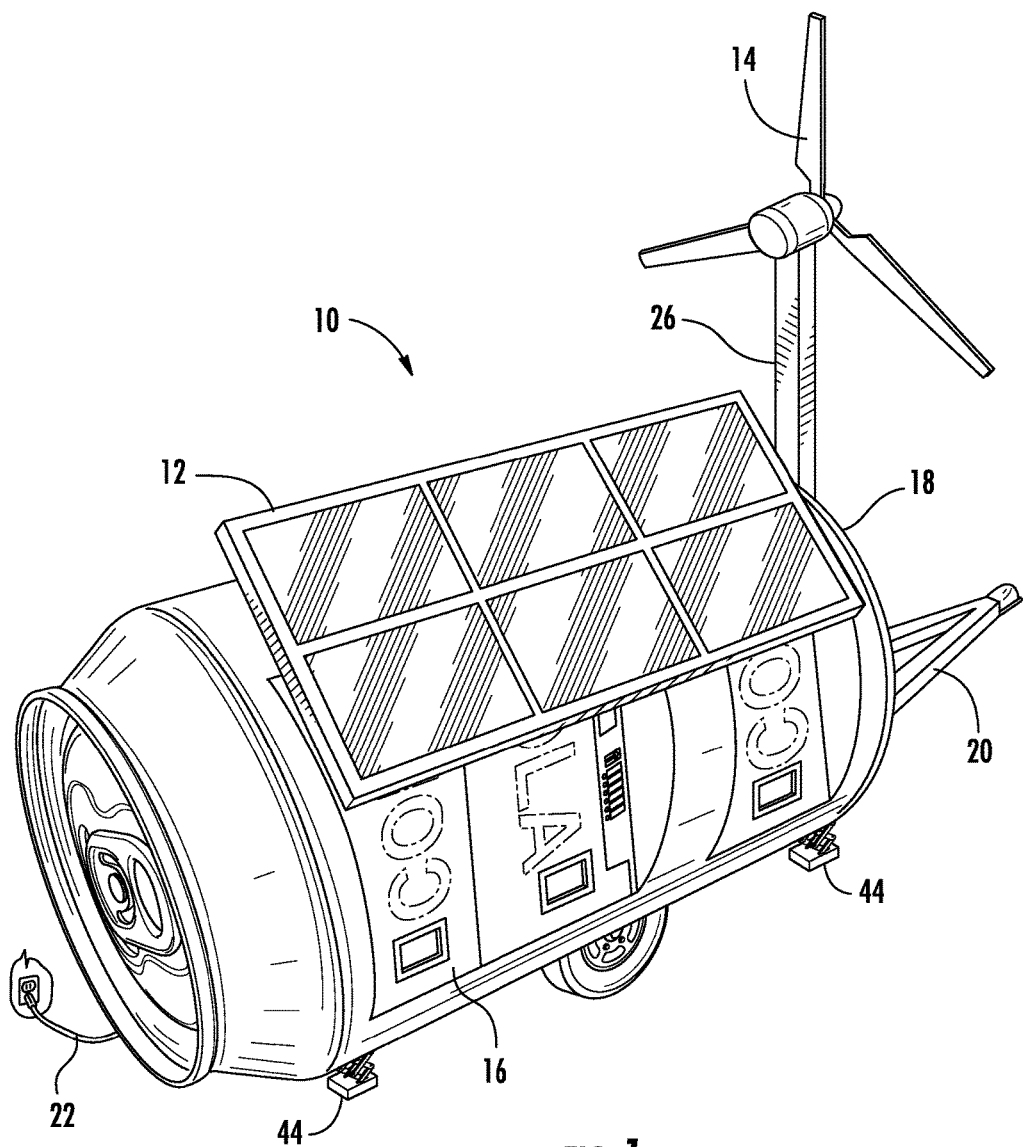
FIG. 1 is a front perspective view of a mobile vending trailer, illustrating, in particular, a solar panel array, a wind turbine, and multiple vending machines powered by one or more alternative power sources, according to an embodiment of the technology described herein.
Figure 2:
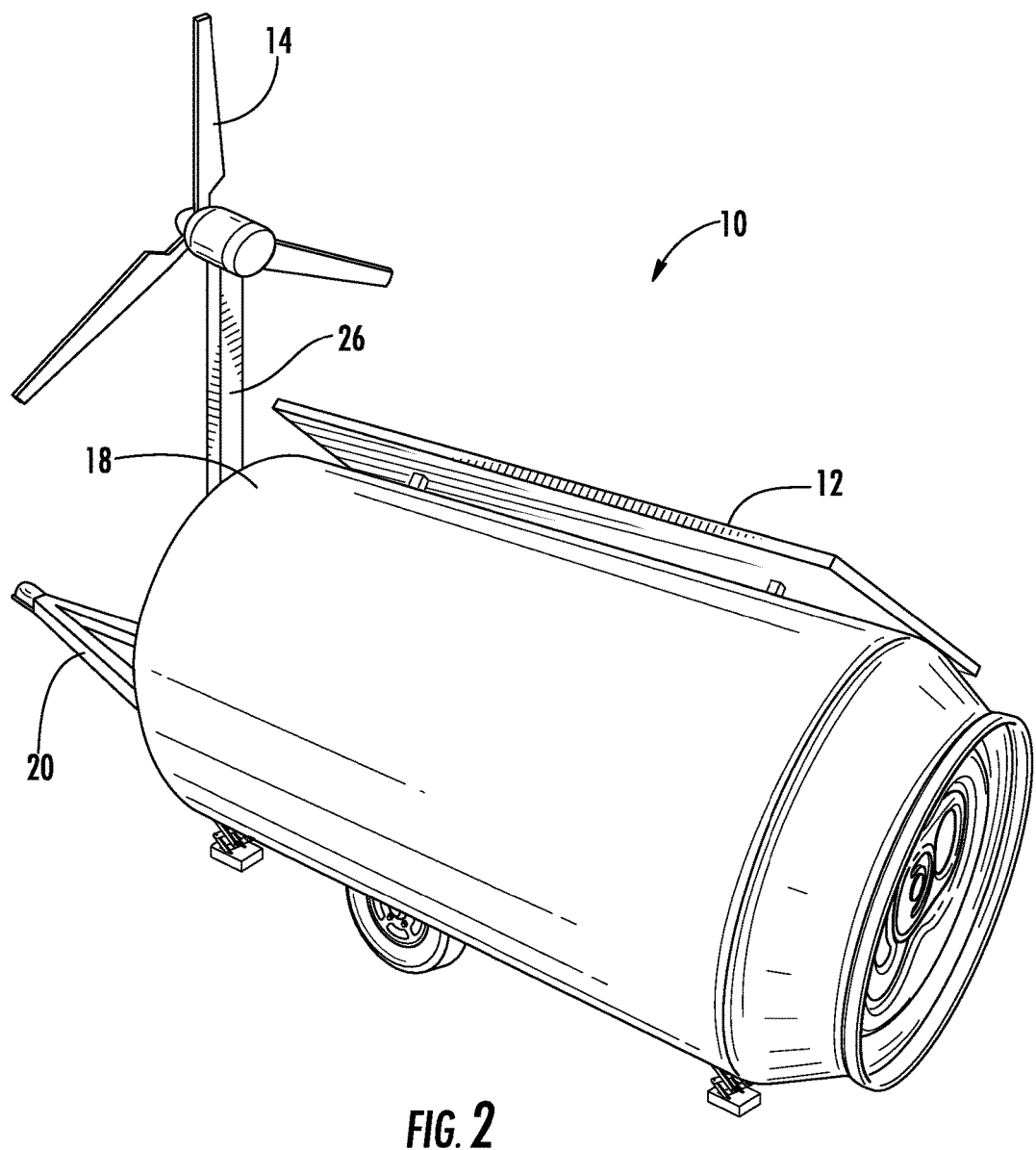
FIG. 2 is a rear perspective view of the mobile vending trailer depicted in FIG. 1, according to an embodiment of the technology described herein.
Figure 3:
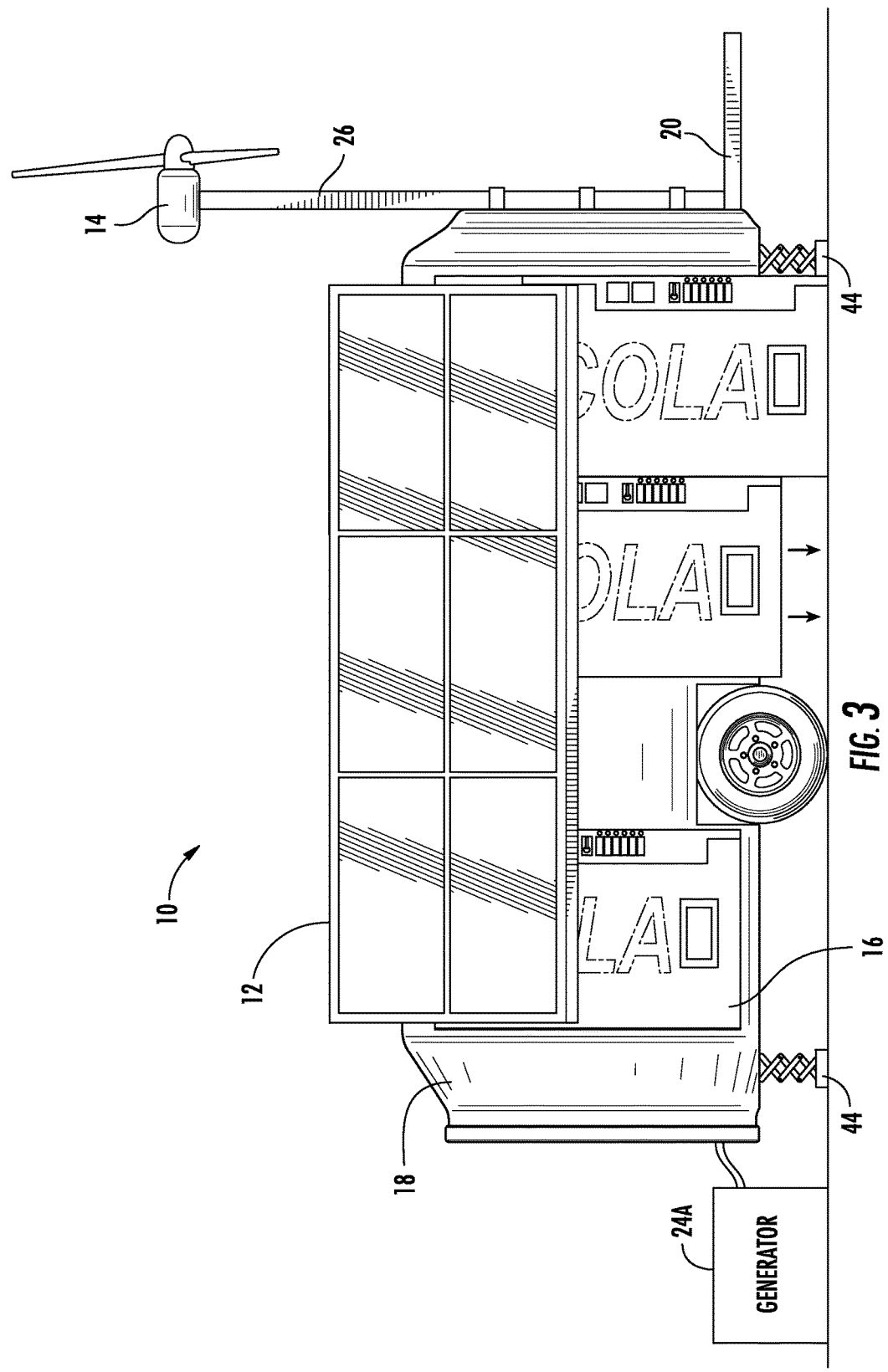
FIG. 3 is a side view of the mobile vending trailer depicted in FIG. 1, illustrating, in particular, an embodiment having an external generator, and the ability of the vending machines to be lowered to and raised from ground level, individually, according to an embodiment of the technology described herein.
Figure 4:
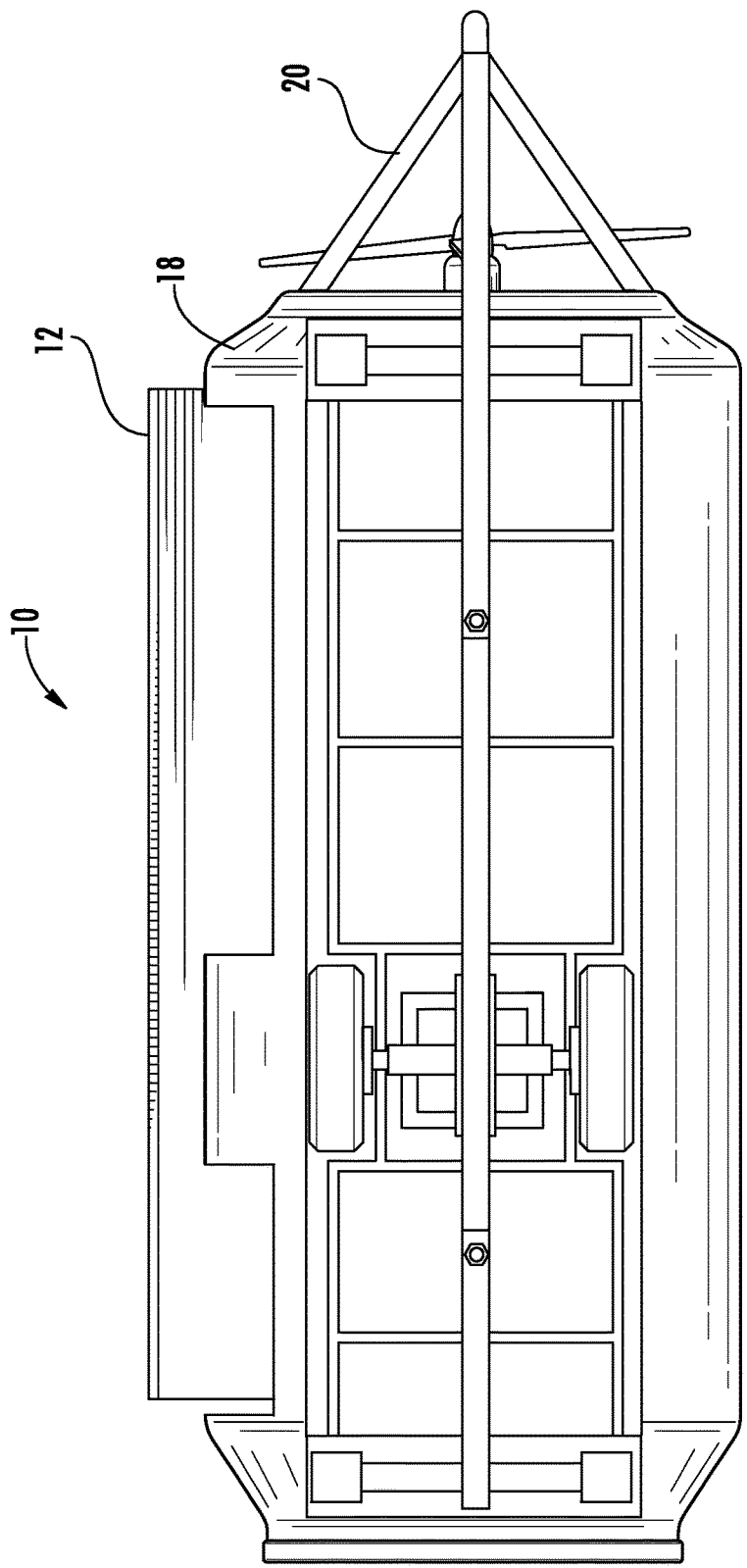
FIG. 4 is a bottom view of the mobile vending trailer depicted in FIG. 1, illustrating, in particular, the trailer chassis, according to an embodiment of the technology described herein.
Figure 5:
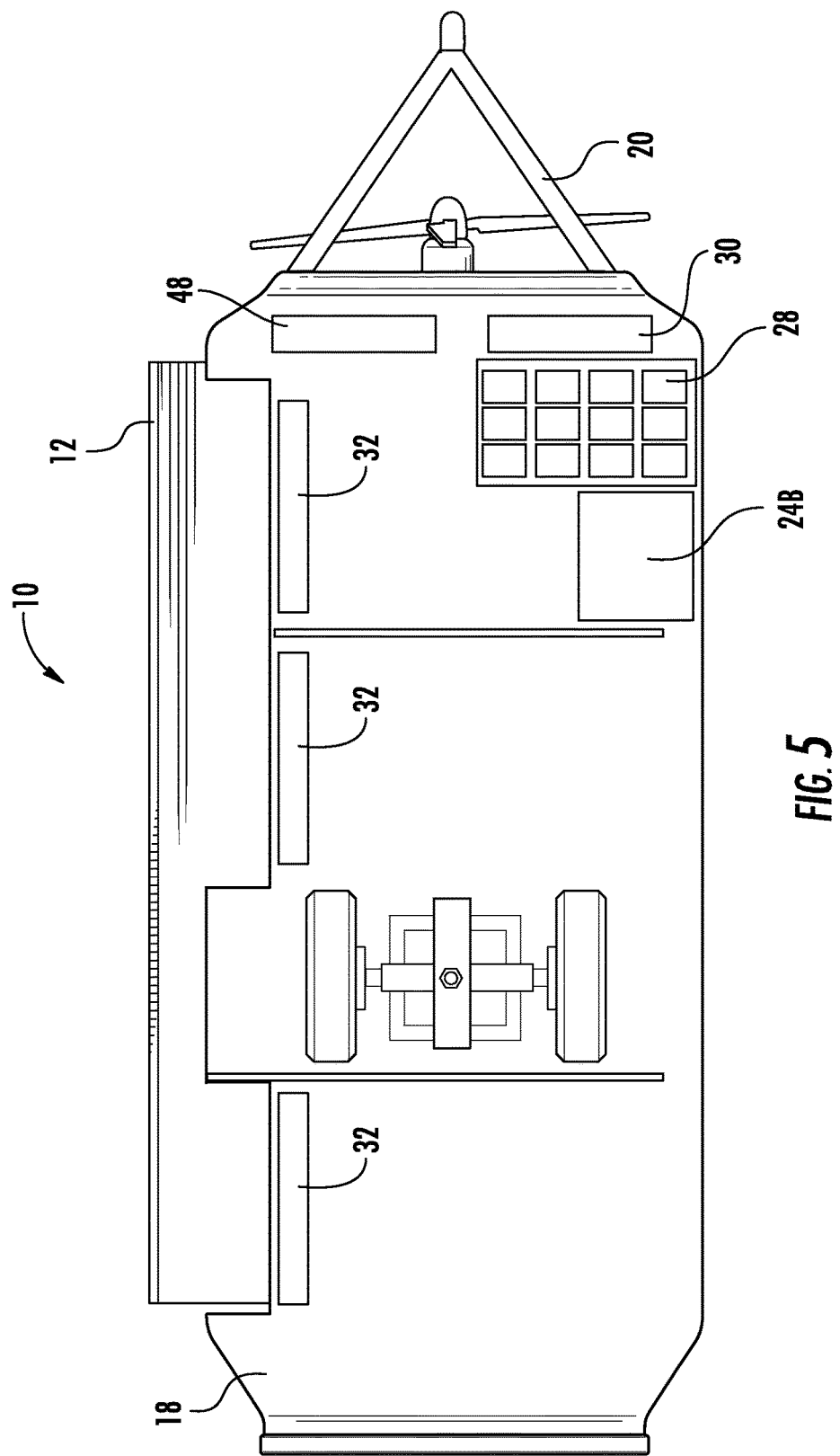
FIG. 5 is a bottom, cross-sectional view of the mobile vending trailer depicted in FIG. 1, illustrating, in particular, internal components including battery packs, an internal generator, a combiner, and lift motors, according to an embodiment of the technology described herein.

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a self-contained mobile vending apparatus, such as a portable vending trailer. The self-contained mobile vending apparatus is configured to hold and transport vending equipment and machines, to provide vending services to patrons, and to provide power to the vending equipment with one or more interchangeable power sources including both traditional and alternative power sources. The self-contained mobile vending apparatus is configured for easy transportability and fast and easy set-up.

The self-contained mobile vending apparatus is adapted with online connectivity to provide, for example, inventory updates via the internet, or other like network or communications access, with 24/7 remote accessibility. As such, the self-contained mobile vending apparatus is adapted for remote monitoring, inventory management, safety checks, alarms, security, temperature controls, closed circuit cameras, and so forth.

By way of example, the self-contained mobile vending apparatus is useful in remote locations, which have no traditional power source, such as county or state fairgrounds, craft shows, festivals, the desert, parks, athletic events, parking lots, and the like.

By utilizing power from alternative power sources, such as solar and wind power, the mobile vending trailer provides a novel solution to powering portable vending machines that is environmentally sound. Although the mobile vending apparatus preferably is powered by alternative power sources, such as electricity generated by solar power and wind power, the mobile vending apparatus also is capable of coupling to the existing power grid and to various types of electrical generators. The mobile vending apparatus is adapted for use both off-grid and on-grid.

When the mobile vending trailer is used on-grid, a grid-tie inverter is utilized to feed a net outflow of power into the utility grid. As such, as wind and solar power is harnessed to charge batteries and power the vending machines, excess power is fed back into the utility grid. In many locales, individuals and businesses are permitted to sell their energy to the utility grid under a net metering policy. For the owner of the mobile vending trailer, this can further reduce or offset the costs of operation.

The mobile vending apparatus is designed to accommodate one or more vending machines of various products and food and beverage items, such as, for example, beverages, sundries, industrial supplies, toys, lotions, clothing, gifts, gift cards, electronics, novelty items, and so forth. The mobile vending apparatus is available in varied sizes based on the number of vending machines stored within the kiosk and the specific application and desired locations of the mobile vending apparatus. The mobile vending apparatus is configured for storage of additional product, which is yet to be placed within a vending machine, within the housing of the vending apparatus.

Referring now to the Figures, a mobile vending apparatus 10 is shown. The mobile vending apparatus is fully self-contained. In various embodiments, the mobile vending apparatus 10 is solar-powered, wind-powered, AC powered, generator-powered, or powered by any interchangeable combination and/or use of one or more of the above power sources. This provides multifaceted use of the mobile vending apparatus 10 in a variety of scenarios of traditional power availability/unavailability and the availability of alternative sources such as wind and solar.

The mobile vending apparatus 10 includes a portable chassis 20. The portable chassis 20 provides the mobile vending apparatus 10 a means by which vending machines 16 can be transported. The portable chassis 20 includes a tongue for attachment to a truck or other vehicle adapted to pull the mobile vending apparatus 10. The tongue is removable when the mobile vending apparatus 10 is in use. This enables the mobile vending apparatus 10 to resemble a stationary vending stand, or the like, rather than a traditional trailer. In at least one embodiment, the mobile vending apparatus 10 and the portable chassis 20 is a trailer. In at least one alternative embodiment, the mobile vending apparatus 10 and the portable chassis 20 is a truck. As will be apparent to one of ordinary skill in the art, upon reading this disclosure, the mobile vending apparatus can vary in use in terms of mobile versions, such as a trailer and truck, and temporarily stationary versions, such as a trailer with the tongue removed and made more lasting and stationary for a longer even, fair, or the like.

At least one embodiment of the portable chassis 20 includes at least two wheels 36 disposed upon opposing ends of a common axle 38. As such, and as depicted specifically in FIG. 6, wheels 36 are coupled to the common axle 38. This embodiment of the portable chassis 20 utilizes a primary frame/beam member 40.

The portable chassis 20 of the mobile vending trailer 10 also includes an axle support frame 34. The axle support frame 34 is configured for retractability such that, for example, the housing 18 can be lowered to a desired level, such as to a ground level surface. Additionally, the axle support frame 34 is configured for extendibility to raise the housing 18 to a desired level, such as level with a platform.

Figure 6:
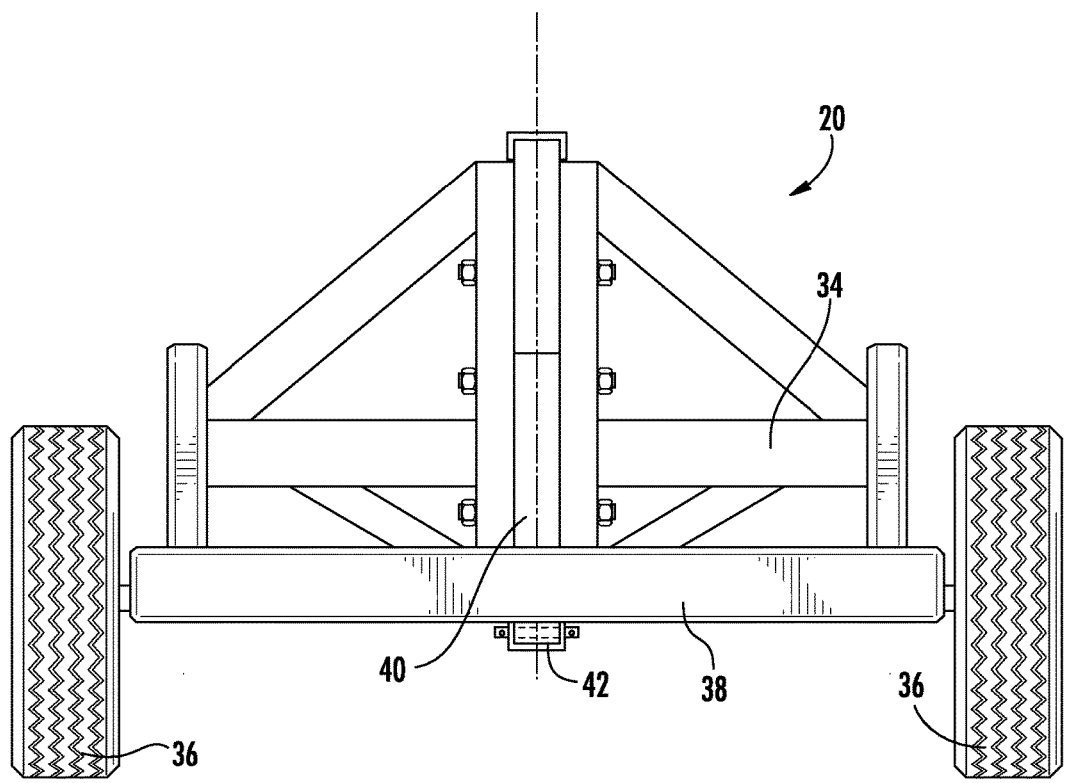
FIG. 6 is a view of a portion of the trailer chassis and common axle, according to an embodiment of the technology described herein.
Figure 7:
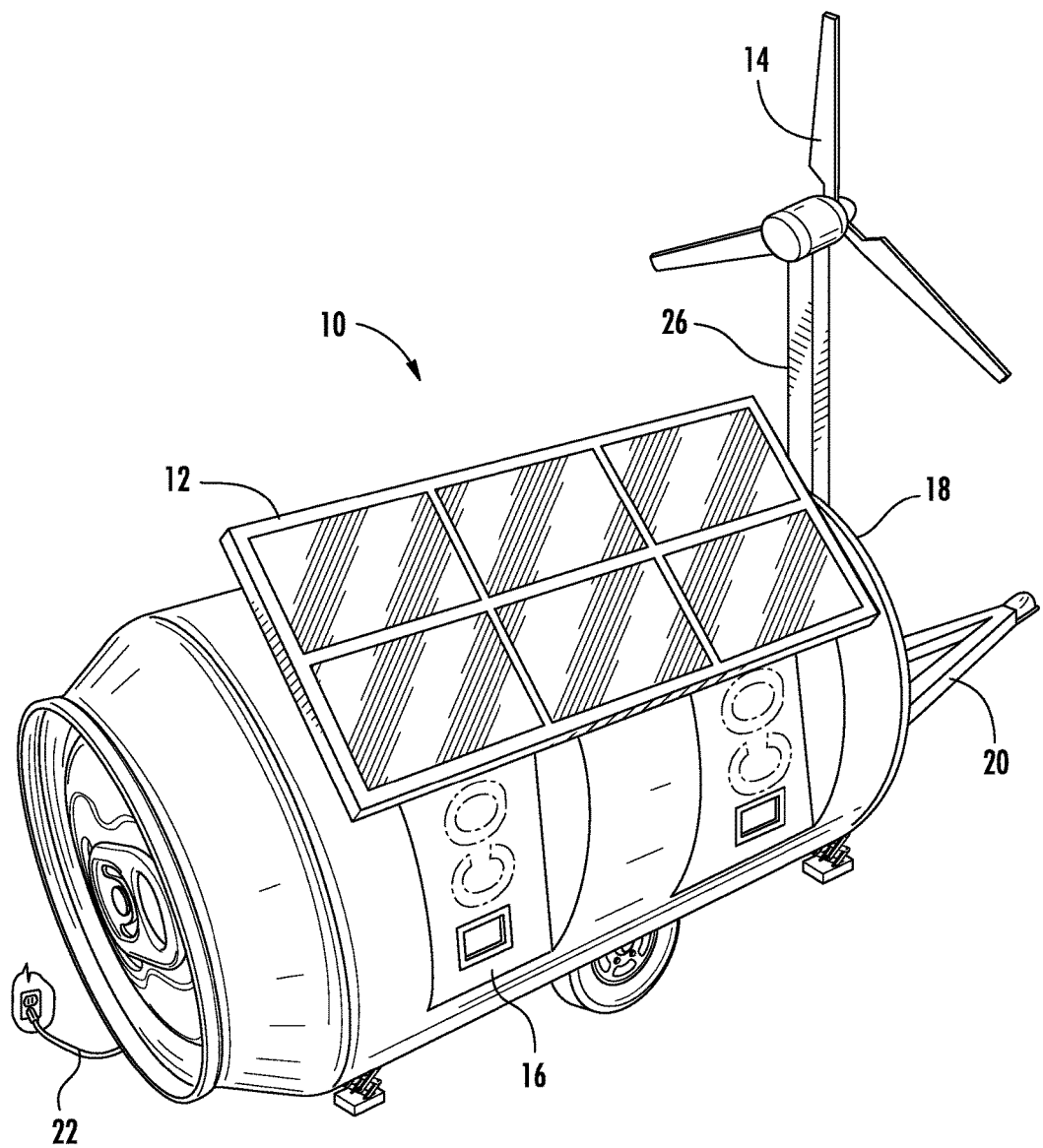
FIG. 7 is a front perspective view of a mobile vending trailer, according to an embodiment of the technology described herein.
Figure 8:
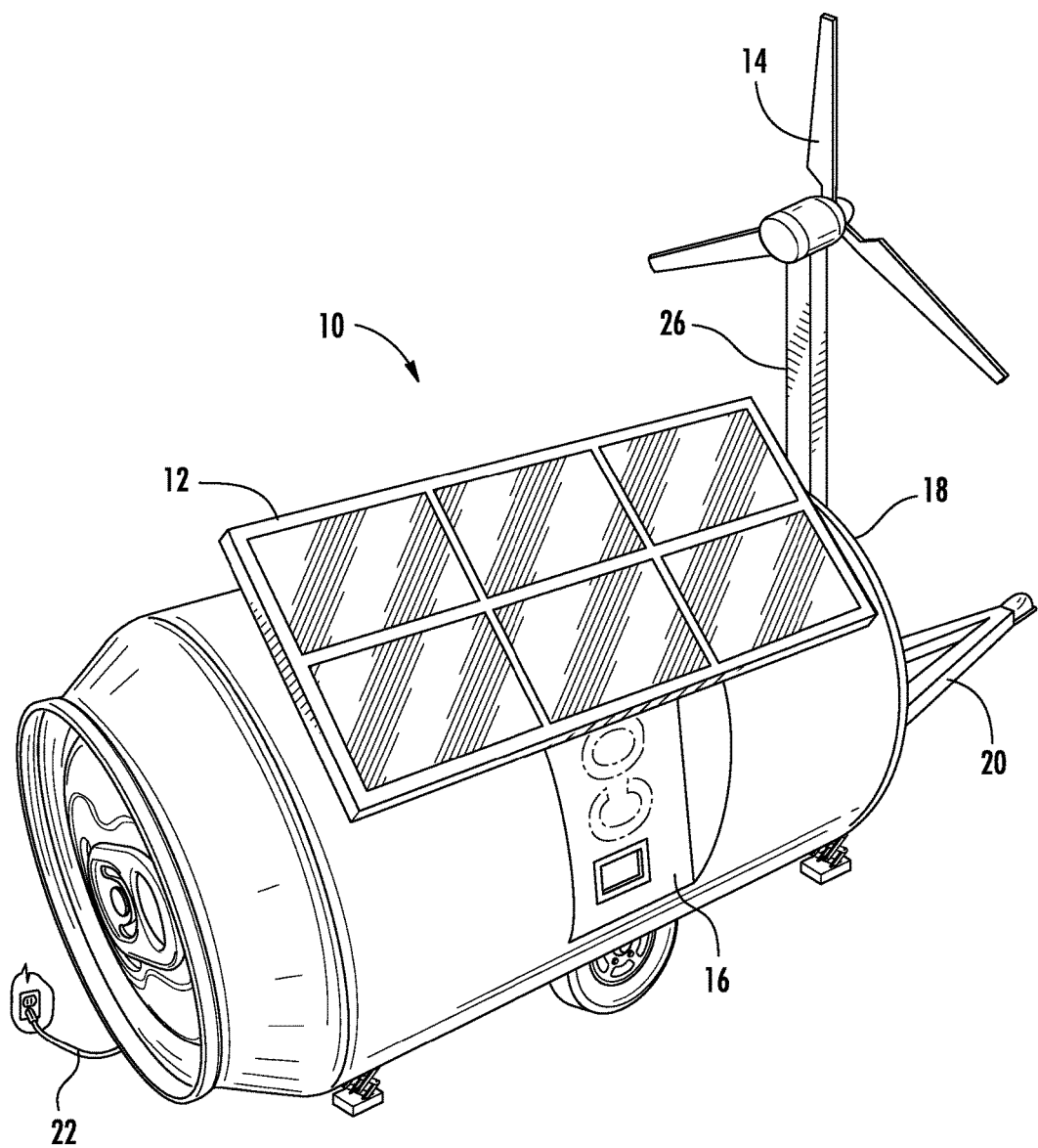
FIG. 8 is a front perspective view of a mobile vending trailer, according to an embodiment of the technology described herein.
Figure 9:
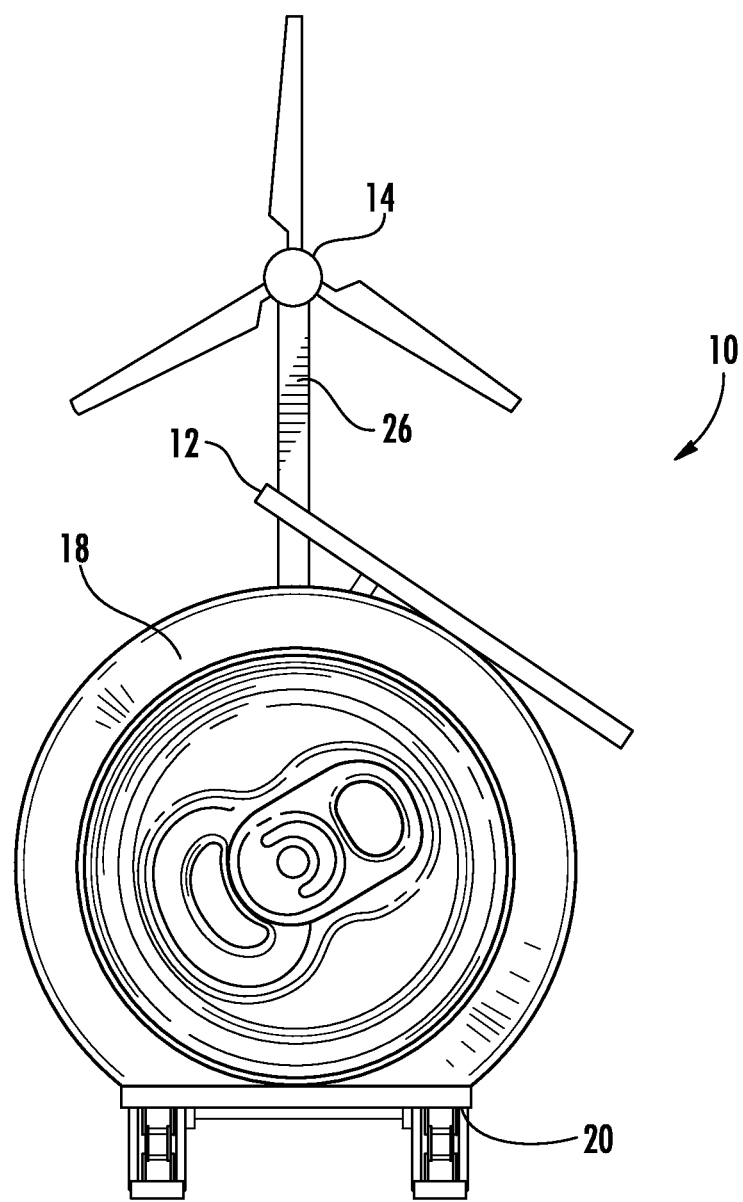
FIG. 9 is an end view of a mobile vending trailer, according to an embodiment of the technology described herein.
Figure 10:
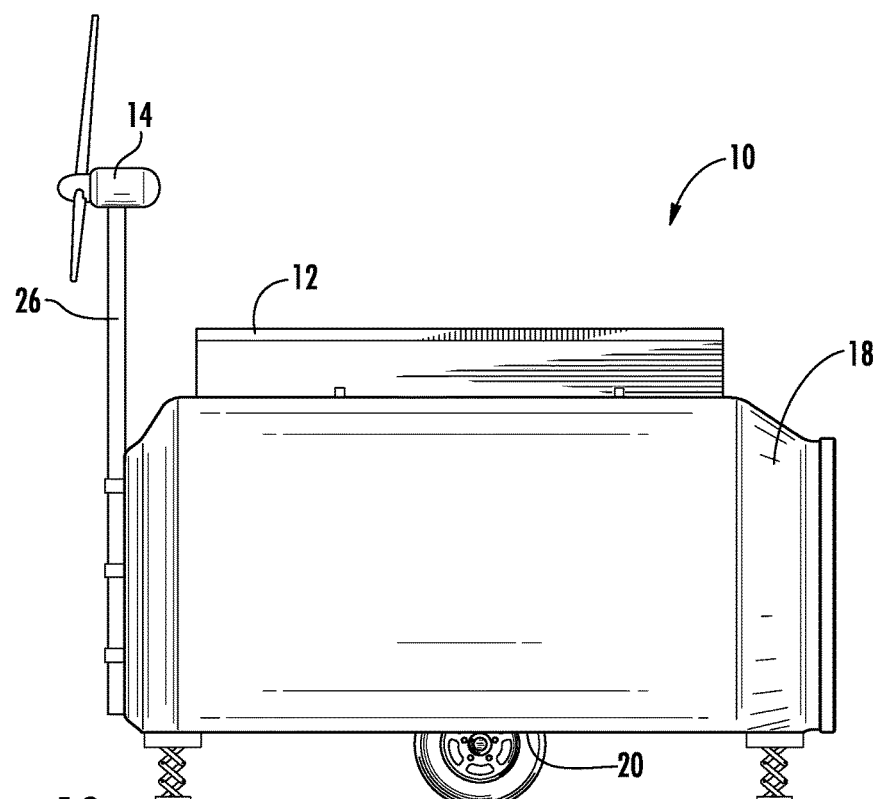
FIG. 10 is a side view of a mobile vending trailer, according to an embodiment of the technology described herein.
Figure 11:
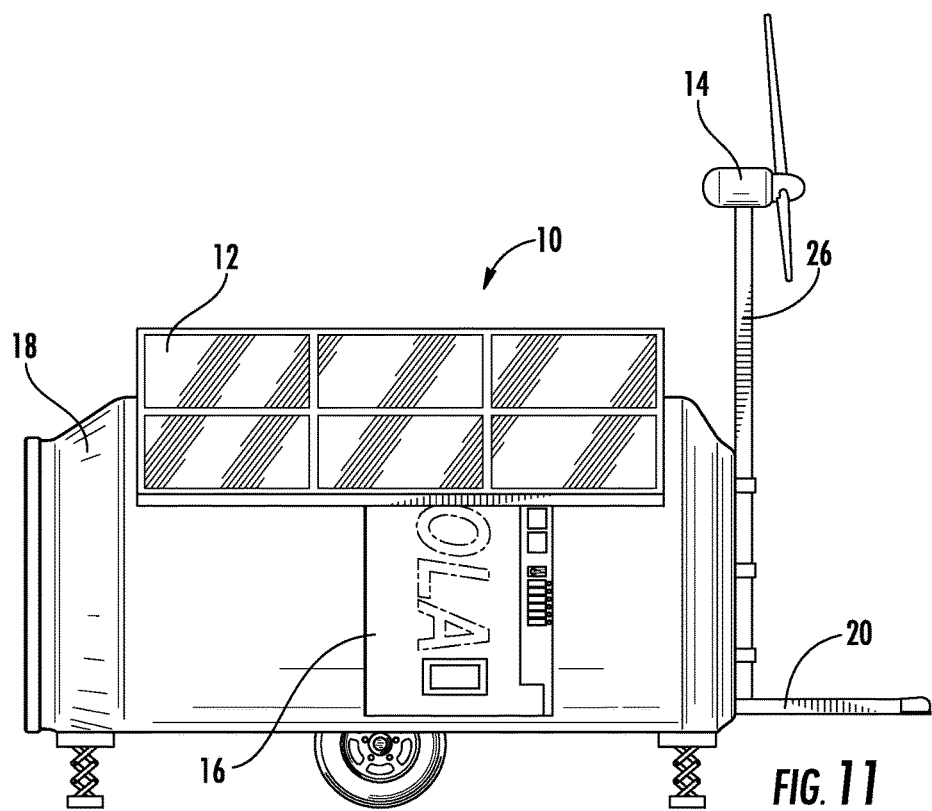
FIG. 11 is a side view of a mobile vending trailer, according to an embodiment of the technology described herein.

As depicted specifically in FIG. 6, the axle support frame 34 can be retracted and extended. A primary frame/beam member 40, generally upright, vertical, and perpendicular to the wheel axle is utilized with a vertical screw jack (not shown). As the vertical screw jack is actuated and rotated either clockwise or counter-clockwise, an axle slot beam yoke either is lowered or raised, respectively, through the primary frame/beam member. As such the entire housing 18 and the various vending machines 16 contained within, are lowered and/or raised to a desired level for use by patrons.

By way of example, and not of limitation, the axle support frame 34 is retracted thirty inches to lower the housing 18 to a ground level surface, such as when the mobile vending trailer 10 is used at a fairground. Also, by way of example, the housing 18 can be raised, after use at ground level, to a height of approximately eleven inches above a ground level for use at a travel height of the mobile vending trailer 10. Leveling jacks 44 can be utilized when the housing is not at ground level.

In at least one embodiment, the axle slot beam yoke 42 utilizes pins to secure to the housing 18 of the mobile vending apparatus 10. The housing 18, and the various vending machines 16 contained within the housing 18, which are accessible to those outside of the housing 18 of the mobile vending apparatus 10, is operably lowered and raised as needed to provide a ground level, a raised level, or the like, accessibility to a user of the vending machines 16.

Alternatively, and as depicted in FIGS. 12-16, a portable chassis 20 with a straight axle design is utilized in at least one embodiment to enable the housing 18 to be lowered to the ground. In this embodiment, the portable chassis 20 includes a straight axle assembly in the portable chassis 20.

Figure 12:
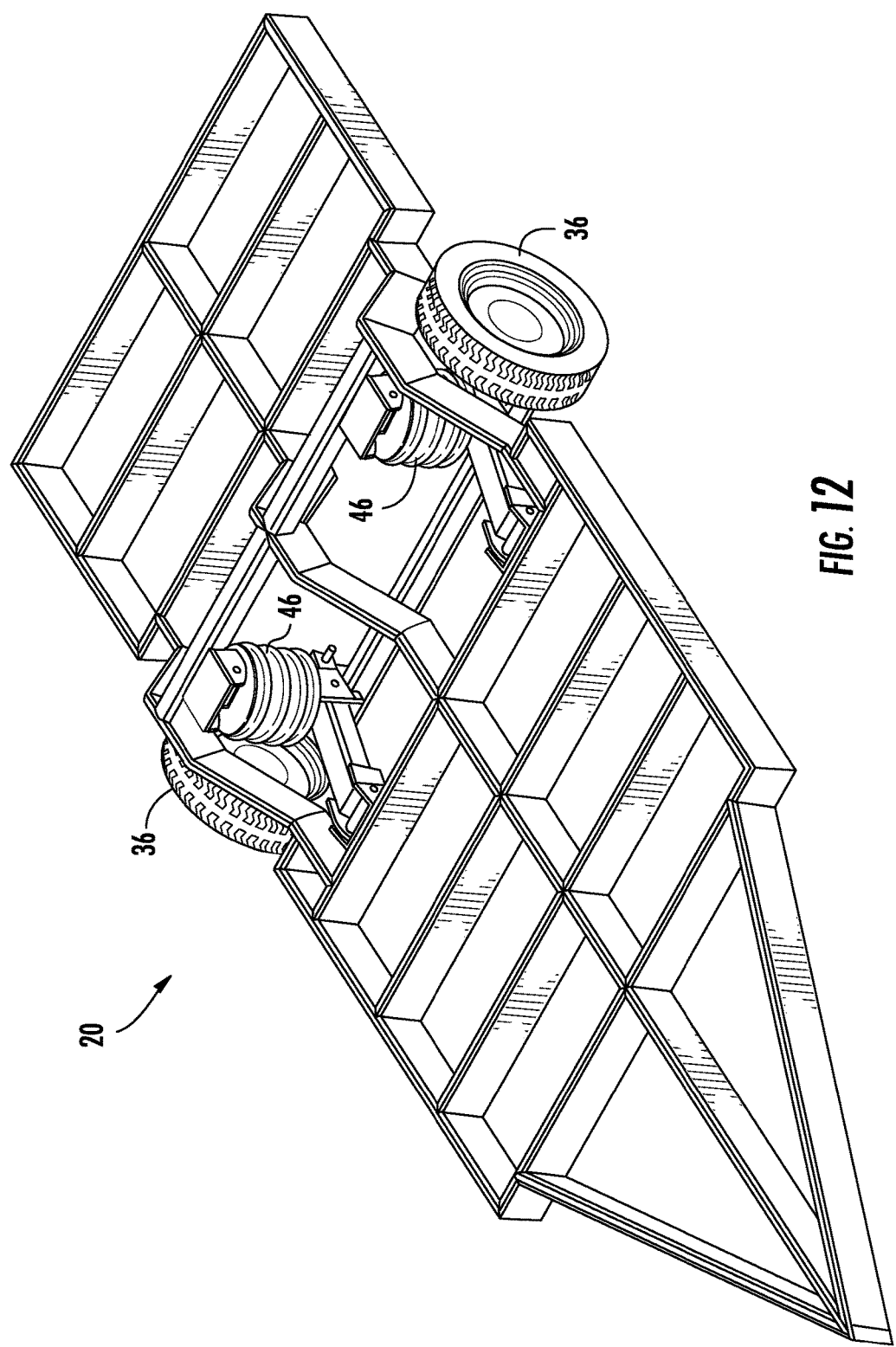
FIG. 12 is a front perspective view of a trailer chassis and straight axle implementation, according to an alternative embodiment of the technology described herein.
Figure 13:
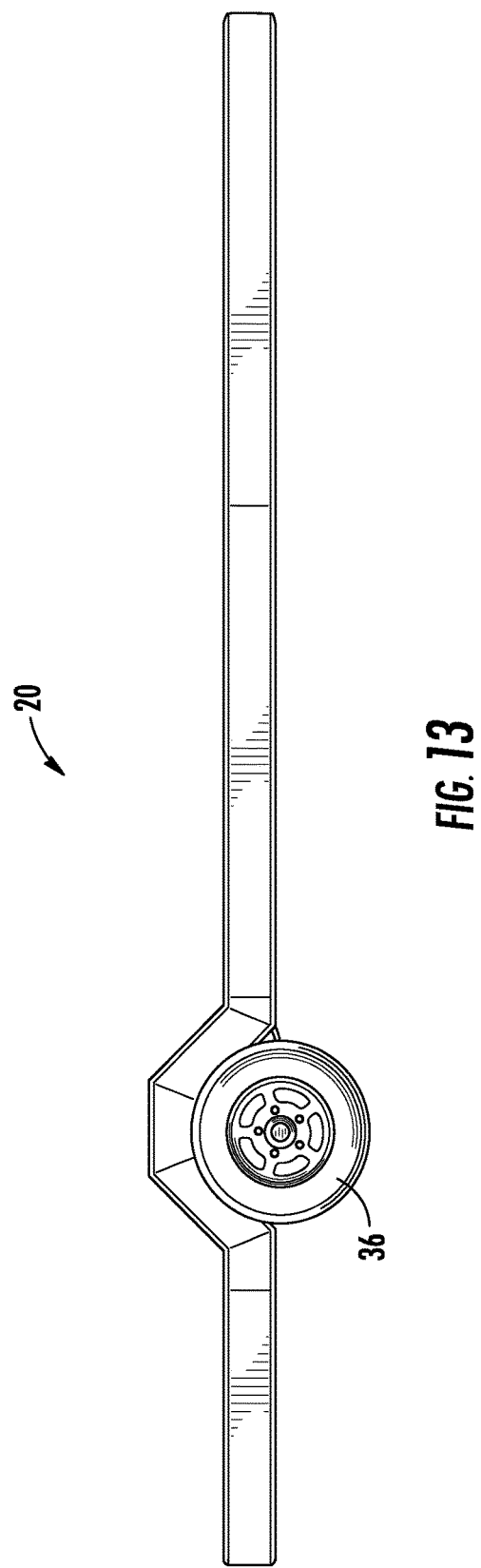
FIG. 13 is a side view of the trailer chassis depicted in FIG. 12.

The portable chassis 20 includes at least one lift assembly 46 disposed within the portable chassis 20 and configured to lower the housing 18, in entirety, from a first level to a second level and to raise the housing 18 from the second level to the first level. FIG. 12 depicts two lift assemblies 46 that are utilized to lower and raise the portable chassis 20 and housing 18 disposed upon it.

Figure 14:
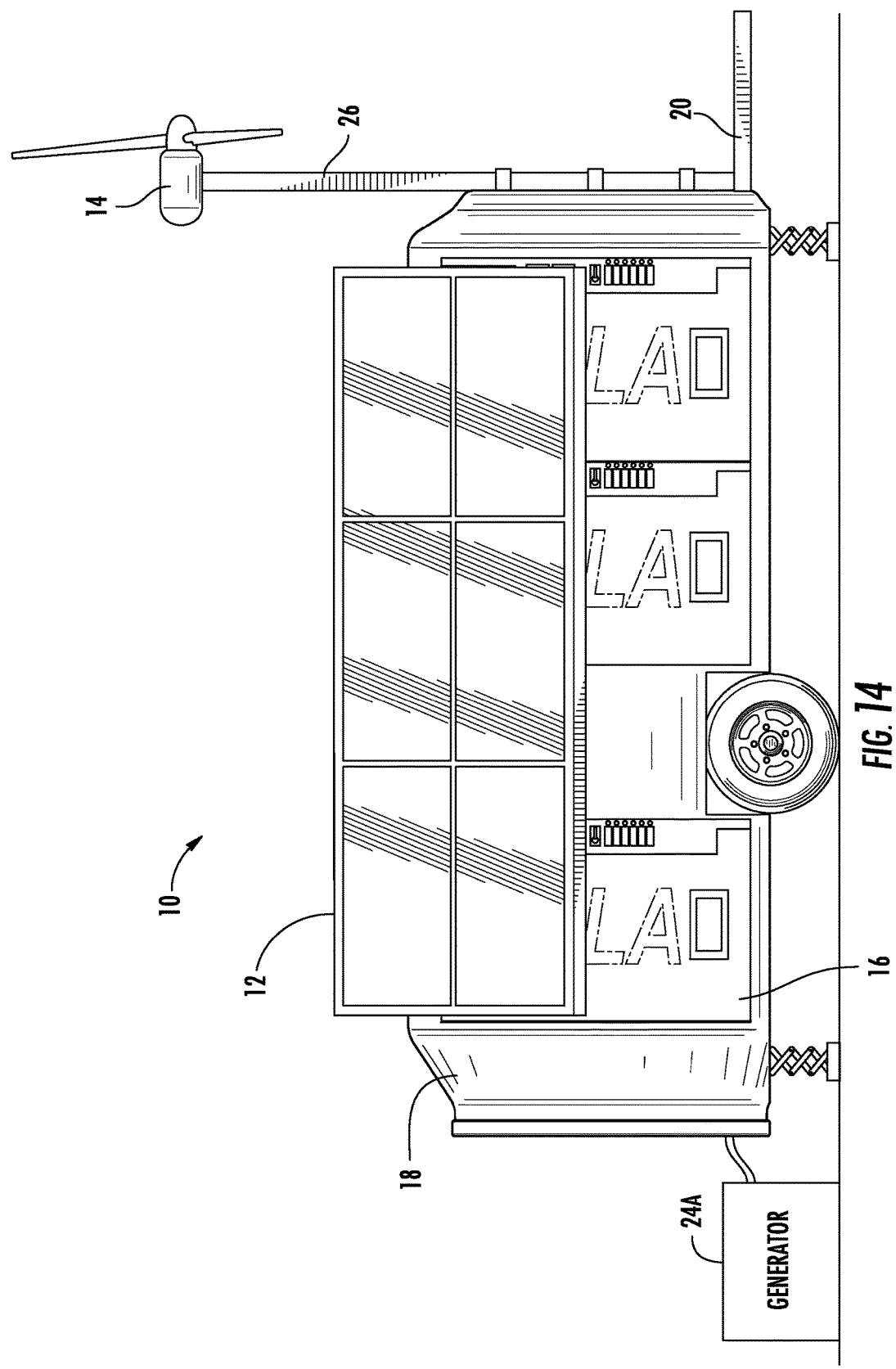
FIG. 14 is a side view of a mobile vending trailer supported on the trailer chassis depicted in FIG. 12.
Figure 15:
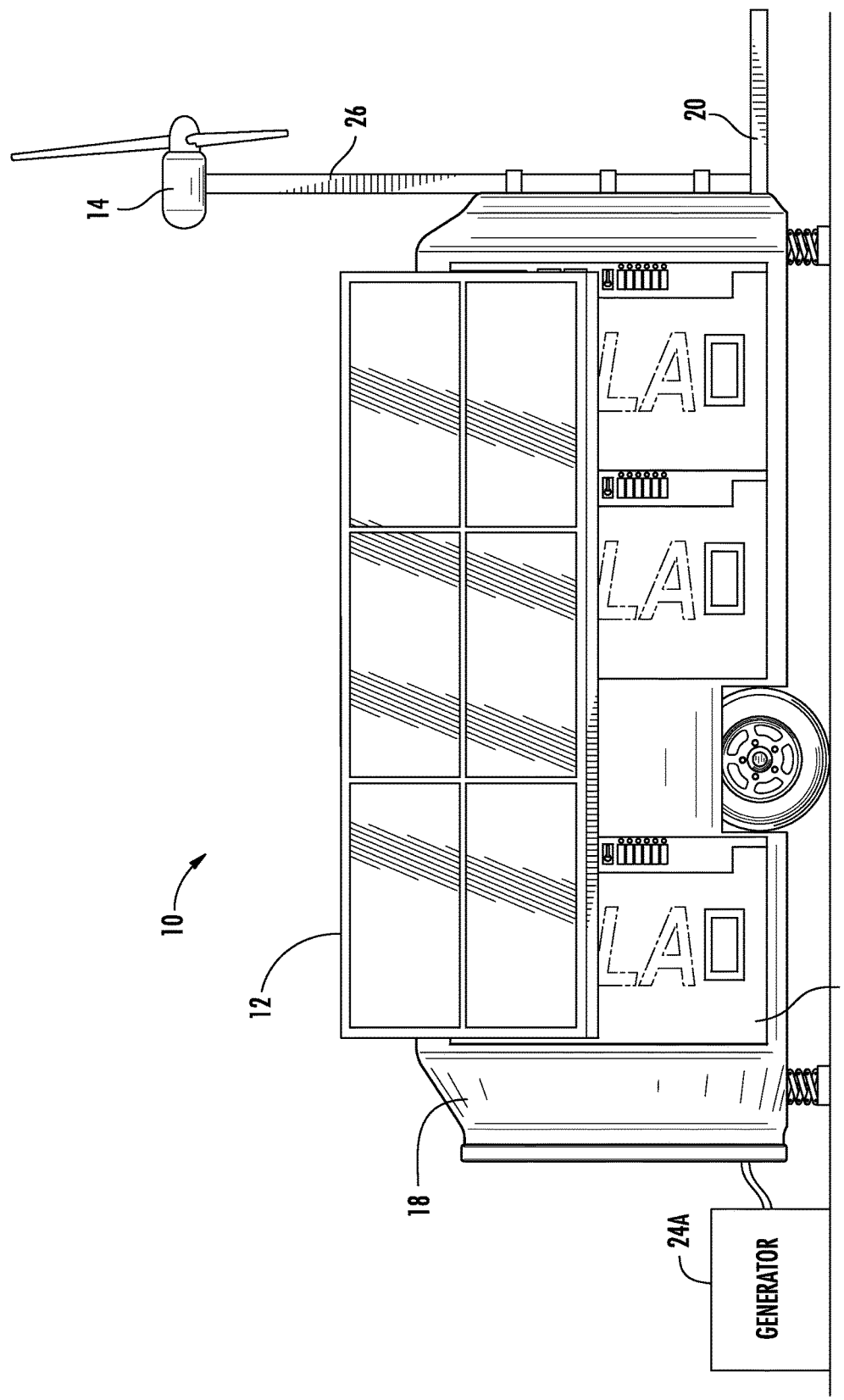
FIG. 15 is a side view of a mobile vending trailer supported on the trailer chassis depicted in FIG. 12, and illustrating, in particular, the ability of the trailer supporting the vending machines to be lowered to and raised from ground level, as shown in transit, according to an embodiment of the technology described herein.
Figure 16:
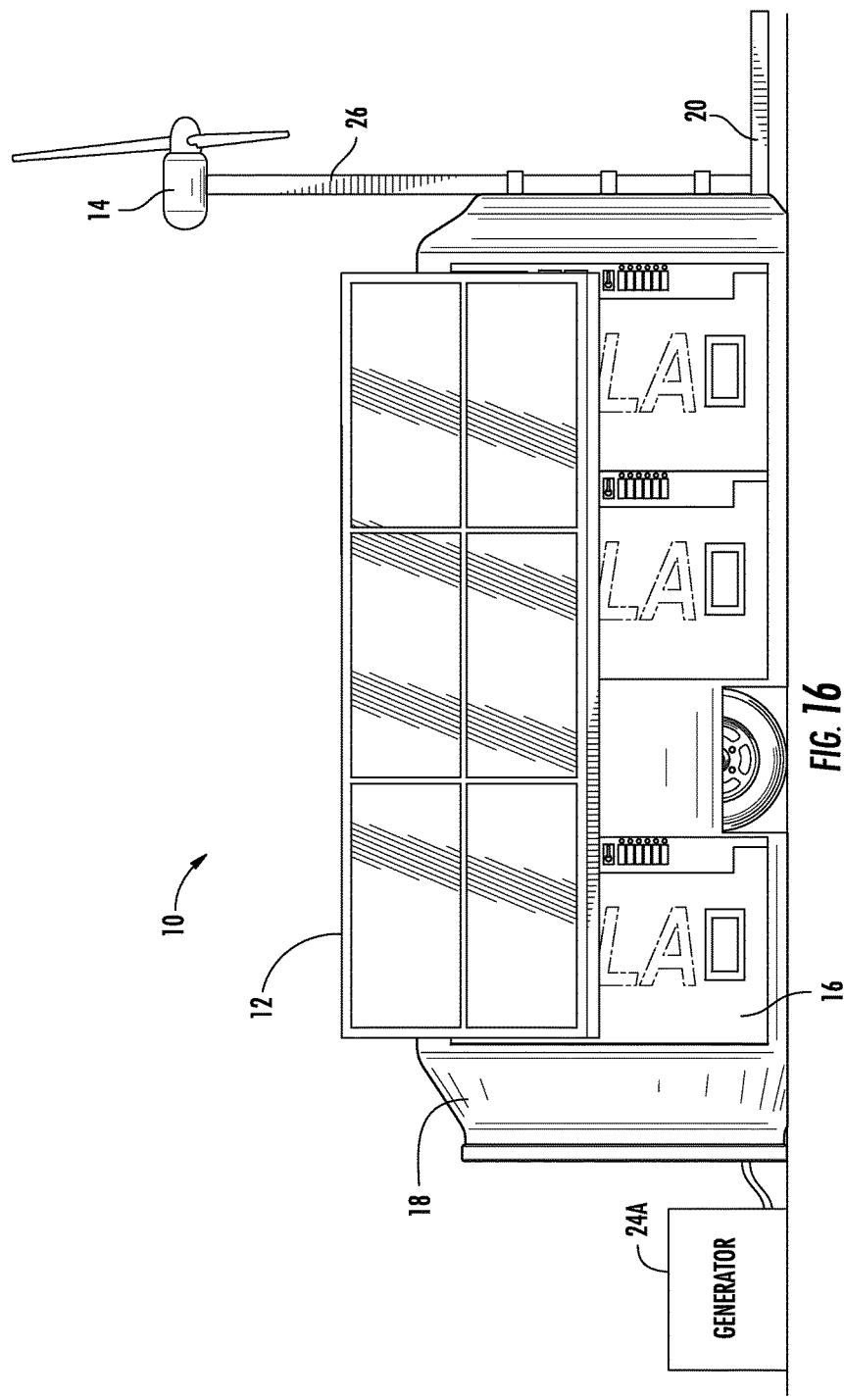
FIG. 16 is a side view of a mobile vending trailer supported on the trailer chassis depicted in FIG. 12, and illustrating, in particular, the ability of the trailer supporting the vending machines to be lowered to and raised from ground level, as shown at ground level, according to an embodiment of the technology described herein.

As depicted in FIGS. 14, 15, and 16, respectively, the housing 18 is shown in a raised position, in transit being lowered, and at ground level, as raised and lowered by the lift assemblies 46. As such the entire housing 18 and the various vending machines 16 contained within, are lowered and/or raised to a desired level by the lift assemblies 46 for use by patrons. The portable chassis 20 can be used with or without leveling jacks 44. Additionally, the tongue of the portable chassis 20 can be removed when the housing 18 is in use at ground level.

In use, the lift assemblies 46 on the portable chassis 20 provide a means to operatively lower and raise the entire housing 18 containing the vending machines 16. This is suitable for locations wherein it is desired to place the vending machines 16 at ground level. This also is suitable for locations wherein it is desired to maintain the vending machines 16 at a predetermined height above ground level.

In various embodiments, other combinations in the number of wheels 36 and the number of wheel axles are used. By way of example, larger implementations can include four wheels. Additionally, the portable chassis 20 embodiments include common and straight axle versions.

The mobile vending apparatus 10 includes a housing 18 disposed upon the portable chassis 20. The housing 18 can be of any size, shape, or design, such that is travels securely upon the portable chassis 20. The housing 18 is durable and is suitable for transit on known transportation networks. As depicted in the Figures, the housing 18 resembles the shape of a beverage or cola can. As will be apparent to one of ordinary skill in the art, upon reading this disclosure, alternative shapes and designs for the housing 18 can be utilized. The housing 18 can be leveled using leveling jacks 44, as depicted in FIG. 1, to ensure that the housing 18 is stable when in use at a desired location.

The mobile vending apparatus 10 includes a solar panel array 12. The solar panel array 12 includes multiple solar panels. The solar panels are mounted to the top of the housing 18 such that they can be moved to obtain a better angle to the sun. As depicted, there are six solar panels in the solar panel array 12. However, the number and placement of the solar panels in the solar panel array 12 can be varied in order to optimize the capture of sunlight or for manufacturing considerations. By way of example, and not of limitation, a thirty-two foot trailer can be configured with enough solar panels to provide up to 2500 kW per month. The solar panel array 12 is configured to capture sunlight and convert the captured sunlight into electricity, thereby to provide solar power to charge the bank of batteries 28 and to charge the vending machines 16.

In various embodiments, the solar panel array 12 is used to power the vending machines 16, or alternatively, to charge the batteries 28, which can power the vending machines 16 even when solar power is unavailable. By way of example, when fully charged, the batteries 28 are numerous enough and are configured to provide power the mobile vending trailer 10 and the vending machines 16 for at least three days when no additional power is generated from the solar panel array 12.

In at least one embodiment, the mobile vending apparatus 10 includes a wind turbine 14. The wind turbine 14 is of a size suitable for mount to a mobile unit such as the mobile vending apparatus 10. The wind turbine 14 can includes blades pushed by wind, as depicted, or any other means to capture wind and transfer the power. A mast 26 is utilized in at least one embodiment to provide height to the wind turbine 14. The mast is of sufficient height to insure safety in operation of the wind turbine 14. Additionally, in at least one embodiment, the mast 26 is telescopic and extensible. The wind turbine 14 is configured to extract energy from the wind to create wind power, thereby to provide wind power to the bank of batteries 28 and to the vending machine 16.

In various embodiments, the wind turbine 14 is used to power the vending machines 16, or alternatively, to charge batteries 28, which can power the vending machines 16 even when wind power is unavailable. Preferably, the batteries 28 are configured to have a three-day charge, such that if no wind power, or other power source, is available, the batteries 28 can provide power to the vending machines 16 for this extended amount of time.

The mobile vending apparatus 10 includes a grid tie inverter 48. The grid-tie inverter 48 is configured to feed a net outflow of power into the utility grid when the mobile vending apparatus 10 is on-grid. The grid-tie inverter 48 is a type of inverter used in alternative power systems, such as those for renewable energy, to convert direct current into alternating current and feed it into the utility grid. The grid tie inverter 48 provides the owner of the mobile vending apparatus 10 with a means to feed unused power to the utility grid. This can aid in reducing or offsetting the costs of operating the mobile vending apparatus 10.

The mobile vending apparatus 10 includes multiple batteries 28. The batteries 28 are arranged in an array or bank. The batteries 28 are configured to be charged, used, and recharged from the electricity generated from the solar panel array 12, the wind turbine 14, AC power 22, or other power source, such as an electric generator 24 (exterior 24A, interior 24B), in order to provide power to the vending machines 16. The mobile vending apparatus is adapted for use both off-grid and on-grid. Traditional AC power 22, as depicted in FIG. 1, can be utilized when available to restore the batteries 28.

The mobile vending apparatus 10 includes a control system 30. The control system 30 is located securely within the housing 18. The control system 30 is configured to control the batteries 28, solar power array 12, and the wind turbine 14. A function of the control system 30 also can include a solar array combiner to combine a plurality of inputs from the plurality of solar panels. A function of the control system 30 also can include an inverter to convert between direct current (DC) and alternating current (AC). Furthermore, a function of the control system 30 includes online connectivity to provide, for example, inventory updates via the internet, or other like network or communications access, with 24/7 remote accessibility. As such, the self-contained mobile vending apparatus 10 is adapted for remote monitoring, inventory management, safety checks, alarms, security, temperature controls, closed circuit cameras, and so forth.

The mobile vending apparatus 10 can include at least one lift 32 for an individual vending machine 16. This provides an additional or alternative means by which a vending machine 16 can be lowered and raised. The means by which the entire chassis 20 and housing 18 are lowered was described earlier in this disclosure. In one embodiment, each lift 32 is configured to lower a vending machine 16 from a first level in the housing 18 to a second level and to raise the at least one vending machine 16 from the second level to the first level. By way of example, the second level is a ground surface level.

In each of these described embodiments, multiple vending machines can be used. In these embodiments, the mobile vending apparatus can include a shared user interface and a shared dispenser disposed upon the housing of the mobile vending apparatus and coupled internally within the housing to each of the plurality of vending machines, wherein a user has access to an inventory of each of the plurality of vending machines through the shared user interface and receives an order through the shared dispenser. The shared user interface and shared dispenser can be coupled to two or more machines. Not all machines within the housing need use the shared user interface and a shared dispenser. As will be apparent to one of ordinary skill in the art, upon reading this disclosure, the number of vending machines utilized and the number of the machines coupled to the shared user interface and a shared dispenser can vary accordingly.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A solar-powered mobile vending apparatus comprising:
   a portable trailer chassis;
   a trailer housing disposed upon the portable trailer chassis, the trailer housing having mounts disposed upon a top external surface configured for a plurality of fixedly mounted and angle-adjustable solar panels;
   at least one vending machine configured to be stored and transported in the housing upon the portable trailer chassis;
   at least one lift assembly disposed within the portable chassis and configured to lower the housing, in entirety, from a first level to a second level and to raise the housing from the second level to the first level;
   a solar panel array, fixedly mounted upon the trailer housing mounts yet angle-adjustable to obtain a desired angle relative to the sun and having the plurality of solar panels, configured to capture sunlight and convert the captured sunlight into electricity, thereby to provide solar power to the at least one vending machine disposed within the trailer housing;
   a plurality of batteries disposed within the trailer housing and configured for charge from the electricity generated from the solar panel array in order to provide power to the at least one vending machine;
   a control system, located securely within the trailer housing, having a plurality of control components to control the plurality of batteries and the solar panel array, and to provide online internet connectivity, remote accessibility, and remote monitoring, the control system further comprising:
      a solar array combiner configured to combine a plurality of inputs from the each of the plurality of solar panels; and
      an inverter to convert between direct current (DC) as used by the plurality of batteries and alternating current (AC) as used to power the at least one vending machine; and
   a grid-tie inverter coupled to the solar array combiner and configured to convert direct current from the solar panel array into alternating current and feed the alternating current into the utility power grid, thereby to feed a net outflow of power generated by the solar panel array greater than any amount of power drawn down from the utility power grid into the utility power grid when the mobile vending apparatus is on-grid, attached electrically coupled to the utility power grid;
   wherein the solar-powered mobile vending apparatus is adapted for use both off-grid and electrically uncoupled from the utility power grid and on-grid and electrically coupled to the utility power grid.

2. The mobile vending apparatus of claim 1, further comprising:
   at least one lift configured to lower the at least one vending machine from a first level in the housing to a second level and to raise the at least one vending machine from the second level to the first level.

3. The mobile vending apparatus of claim 1, further comprising:
   an electrical generator to provide an additional power source to the plurality of vending machines when solar power is unavailable or the plurality of batteries is consumed.

4. The mobile vending apparatus of claim 1, further comprising:
   a wind turbine, having a plurality of blades pushed by wind, and configured to extract energy from the wind to create wind power, thereby to provide wind power to the at least one vending machine when solar power is unavailable.

5. The mobile vending apparatus of claim 1, wherein the portable chassis further comprises:
   at least two wheels disposed upon opposing ends of a common axle;
   an axle support frame; and
   at least one lift assembly disposed within the portable chassis and configured to lower the housing, in entirety, from a first level to a second level and to raise the housing from the second level to the first level;
   wherein the at least two wheels and the axle support frame are retractable to allow for operation of at least one lift configured to lower the at least one vending machine from a first level in the housing to a second level and to raise the at least one vending machine from the second level to the first level.

6. The mobile vending apparatus of claim 1, wherein the at least one vending machine further comprises a plurality of vending machines, the mobile vending apparatus further comprising:
   a shared user interface and a shared dispenser disposed upon the housing of the mobile vending apparatus and coupled internally within the housing to each of the plurality of vending machines, wherein a user has access to an inventory of each of the plurality of vending machines through the shared user interface and receives an order through the shared dispenser.

7. A wind-powered mobile vending apparatus comprising:
   a portable trailer chassis;
   a trailer housing disposed upon the portable trailer chassis, the trailer housing having mounts disposed upon an external surface configured for a wind turbine fixedly mounted to the external surface;
   at least one vending machine configured to be stored and transported in the housing upon the portable trailer chassis;
   wherein the wind turbine, having a plurality of blades pushed by wind, is configured to extract energy from the wind to create wind power, thereby to provide wind power to the at least one vending machine disposed within the trailer housing;
   at least one lift assembly disposed within the portable chassis and configured to lower the housing, in entirety, from a first level to a second level and to raise the housing from the second level to the first level;
   a plurality of batteries disposed within the trailer housing and configured for charge from the electricity generated from the wind turbine in order to provide power to the at least one vending machine;
   a control system, located securely within the trailer housing, having a plurality of control components to control the plurality of batteries and the wind turbine, and to provide online internet connectivity, remote accessibility, and remote monitoring; and a grid-tie inverter coupled to the control system and configured to feed a net outflow of power generated by the wind turbine greater than any amount of power drawn down from the utility power grid into the utility power grid when the mobile vending apparatus is on-grid, attached electrically coupled to the utility power grid;

wherein the wind-powered mobile vending apparatus is adapted for use both off-grid and electrically uncoupled from the utility power grid and on-grid and electrically coupled to the utility power grid.

8. The wind-powered mobile vending apparatus of claim 7, further comprising:

at least one lift configured to lower the at least one vending machine from a first level in the housing to a second level and to raise the at least one vending machine from the second level to the first level.

9. The wind-powered mobile vending apparatus of claim 7, further comprising:

an electrical generator to provide an additional power source to the plurality of vending machines when wind power is unavailable or the plurality of batteries is consumed.

10. The wind-powered mobile vending apparatus of claim 7, further comprising:

a solar panel array, having a plurality of solar panels disposed upon the housing, configured to capture sunlight and convert the captured sunlight into electricity, thereby to provide solar power to the at least one vending machine when wind power is unavailable.

11. The wind-powered mobile vending apparatus of claim 7, wherein the portable chassis further comprises:

at least two wheels disposed upon opposing ends of a common axle;

an axle support frame; and at least one lift assembly disposed within the portable chassis and configured to lower the housing, in entirety, from a first level to a second level and to raise the housing from the second level to the first level;

wherein the at least two wheels and the axle support frame are retractable to allow for operation of at least one lift configured to lower the at least one vending machine from a first level in the housing to a second level and to raise the at least one vending machine from the second level to the first level.

12. The wind-powered mobile vending apparatus of claim 7, wherein the at least one vending machine further comprises a plurality of vending machines, the mobile vending apparatus further comprising:

a shared user interface and a shared dispenser disposed upon the housing of the mobile vending apparatus and coupled internally within the housing to each of the plurality of vending machines, wherein a user has access to an inventory of each of the plurality of vending machines through the shared user interface and receives an order through the shared dispenser.

13. A combined solar-powered and wind-powered mobile vending apparatus comprising:

a portable trailer chassis;

a trailer housing disposed upon the portable trailer chassis, the trailer housing having mounts disposed upon a top external surface configured for a plurality of fixedly mounted and angle-adjustable solar panels and the trailer housing having mounts disposed upon a side external surface configured for a fixedly mounted wind turbine;

at least one vending machine configured to be stored and transported in the trailer housing upon the portable chassis;

a solar panel array, fixedly mounted upon the trailer housing mounts yet angle-adjustable to obtain a desired angle relative to the sun and having the plurality of solar panels, configured to capture sunlight and convert the captured sunlight into electricity, thereby to provide solar power to the at least one vending machine disposed within the trailer housing;

a wind turbine, having a plurality of blades pushed by wind, and configured to extract energy from the wind to create wind power, thereby to provide wind power to the at least one vending machine disposed within the trailer housing;

at least one lift assembly disposed within the portable chassis and configured to lower the housing, in entirety, from a first level to a second level and to raise the housing from the second level to the first level;

a plurality of batteries disposed within the trailer housing and configured for charge from the electricity generated from the solar panel array and the wind turbine, in order to provide power to the at least one vending machine;

a control system, located securely within the trailer housing, having a plurality of control components to control the plurality of batteries, the wind turbine, and the solar panel array, and to provide online internet connectivity, remote accessibility, and remote monitoring, the control system further comprising:

a solar array combiner configured to combine a plurality of inputs from the each of the plurality of solar panels; and an inverter to convert between direct current (DC) as used by the plurality of batteries and alternating current (AC) as used to power the at least one vending machine; and a grid-tie inverter coupled to the solar array combiner and configured to convert direct current from the solar panel array into alternating current and feed the alternating current into the utility power grid, thereby to feed a net outflow of power generated by the solar panel array or the wind turbine greater than any amount of power drawn down from the utility power grid into the utility power grid when the mobile vending apparatus is on-grid, attached electrically coupled to the utility power grid;

wherein the solar-powered mobile vending apparatus is adapted for use both off-grid and electrically uncoupled from the utility power grid and on-grid and electrically coupled to the utility power grid.

14. The combined solar-powered and wind-powered mobile vending apparatus of claim 13, further comprising:

at least one lift configured to lower the at least one vending machine from a first level in the housing to a second level and to raise the at least one vending machine from the second level to the first level.

15. The combined solar-powered and wind-powered mobile vending apparatus of claim 13, further comprising:

an electrical generator to provide an additional power source to the plurality of vending machines when solar power and wind power are unavailable or the plurality of batteries is consumed.

16. The combined solar-powered and wind-powered mobile vending apparatus of claim 13, wherein the portable chassis further comprises:
- at least two wheels disposed upon opposing ends of a common axle;
- an axle support frame; and
- at least one lift assembly disposed within the portable chassis and configured to lower the housing, in entirety, from a first level to a second level and to raise the housing from the second level to the first level;
- wherein the at least two wheels and the axle support frame are retractable to allow for operation of at least one lift configured to lower the at least one vending machine from a first level in the housing to a second level and to raise the at least one vending machine from the second level to the first level.

17. The combined solar-powered and wind-powered mobile vending apparatus of claim 13, wherein the at least one vending machine further comprises a plurality of vending machines, the mobile vending apparatus further comprising:
- a shared user interface and a shared dispenser disposed upon the housing of the mobile vending apparatus and coupled internally within the housing to each of the plurality of vending machines, wherein a user has access to an inventory of each of the plurality of vending machines through the shared user interface and receives an order through the shared dispenser.

* * * * *